United States Patent [19]

Dalziel

[11] Patent Number: 5,415,471
[45] Date of Patent: May 16, 1995

[54] CAROUSEL-TYPE MAGNETIC TAPE LIBRARY SYSTEM

[75] Inventor: Warren L. Dalziel, Monte Sereno, Calif.

[73] Assignee: Storage Technology Corporation, Louisville, Colo.

[21] Appl. No.: 210,790

[22] Filed: Mar. 18, 1994

[51] Int. Cl.⁶ .............................................. A47B 81/06
[52] U.S. Cl. ................................. 312/9.46; 312/9.31; 312/9.7; 312/9.9; 312/236; 221/6; 221/76; 360/92
[58] Field of Search ............... 312/9.46, 9.31, 9.7, 312/9.9; 221/6, 21, 76; 360/92

[56] References Cited

U.S. PATENT DOCUMENTS

| | | | |
|---|---|---|---|
| 3,592,975 | 7/1971 | Ban | 360/92 |
| 3,809,263 | 5/1974 | Dodd et al. | 360/92 X |
| 3,872,505 | 3/1975 | Hino et al. | 360/92 |
| 3,872,506 | 3/1975 | Staar | 360/92 |
| 4,049,154 | 9/1977 | Burks | 221/76 |
| 4,164,765 | 8/1979 | Gysling | 360/92 |
| 4,287,541 | 9/1981 | Tanahashi et al. | 360/92 |
| 4,384,310 | 5/1983 | Schatteman et al. | 360/92 |
| 4,789,209 | 12/1988 | Teranishi | 312/9.46 |
| 5,219,094 | 6/1993 | Labriola | 221/76 |
| 5,236,258 | 8/1993 | Bunch | 312/9.46 |
| 5,353,179 | 10/1994 | Elliott et al. | 360/92 |

Primary Examiner—José V. Chen
Assistant Examiner—Rodney B. White
Attorney, Agent, or Firm—Claude A. S. Hamrick

[57] ABSTRACT

An improved carousel-type magnetic tape library system including a pivotable cartridge-receiving door for facilitating the insertion and removal of cartridges into the system and a cylindrical magazine carried by a turntable rotatably mounted to a turntable plate secured to a base casting. The turntable includes a sprocket wheel that is engaged by a drive belt or chain connected to a stepper motor affixed to the base plate. Affixed to the sprocket is a shutter plate having a plurality of notches in its perimeter for detection by an optical-indexing sensor. The apparatus also includes a carousel-indexing sensor and a cartridge-in-carousel and cartridge-orientation sensor. Disposed within the central cavity of the carousel magazine unoccupied by cartridges is a cartridge-onloading/offloading mechanism which is rotatably mounted concentric with the carousel turntable. Disposed on a side of the carousel opposite the door is a dual tape drive assembly including modular tape drive units mounted to the base plate. The apparatus further includes a power supply, an associated electronic subsystem, and a cooling fan.

18 Claims, 11 Drawing Sheets

CAROUSEL-TYPE MAGNETIC TAPE LIBRARY SYSTEM

BACKGROUND OF THE INVENTION

1. Field of the Invention

The present invention relates generally to magnetic tape storage apparatus, and more particularly to an improved carousel-type magnetic tape library system, particularly suited for handling a large quantity of 4 mm helical scan magnetic tape cartridges and the like, and for providing access to the information recorded therein.

2. Brief Description of the Prior Art

As pointed out in my copending applications Ser. Nos. 07/982,939; 07/982,940; 07/983,345; and 07/984,294, all filed on Nov. 30, 1992 and assigned to the assignee of the present invention, tape cartridge libraries for use in providing relatively rapid and automatic access to a large quantity of information are in demand for backing up data on UNIX and PC networks. Although various types of systems have been made available for handling 8 mm and larger-sized tapes, only recently have auto-changer units become available for handling the smaller 4 mm-sized cartridges. However, the presently available 4 mm systems known to Applicant are all limited to use of in-line magazines capable of handling twelve or fewer cartridges and do not readily accommodate operator exchange of a single cartridge. A need therefore exists for a compact carousel library system having a lightweight carousel that has a simple and automatic scheme for retaining cartridges securely during transport and handling, and retaining them in place during motion of the carousel, while at the same time permitting easy removal by library mechanisms as required.

SUMMARY OF THE INVENTION

It is therefore an objective of the present invention to provide an improved carousel-type library system particularly suited for handling data storage cartridges and permitting access to the information stored therein.

Another objective of the present invention is to provide a carousel-type library system having the capacity of handling in excess of twenty data storage cartridges.

Still another objective of the present invention is to provide a carousel-type library system having an access door that enables an operator to load and unload a single cassette to and from the carousel.

A further objective of the present invention is to provide a carousel-type library system that can automatically load and unload a plurality of tape cartridges into and out of multiple drive units.

Another objective of the present invention is to provide a carousel-type tape library that is so narrow that two units can fit side-by-side in a standard 19 inch rack mount configuration.

Another objective of the present invention is to provide a carousel-type library that is less than 5½ inches in height and can fit within a standard rack mount opening.

A still further objective of the present invention is to provide an improved magazine device for a carousel system.

Yet another objective of the present invention is to provide an improved carousel system that utilizes a single drive motor to drive both the turntable and the cartridge load/unload mechanism.

Still another objective of the present invention is to provide an improved access door mechanism for an automatic library system.

Briefly, a preferred embodiment of the present invention includes a pivotable cartridge-receiving access door for facilitating the insertion and removal of tape cartridges into the system and a cylindrical carousel carried by a turntable rotatably mounted to a turntable plate secured to a base casting. The turntable includes a sprocket wheel that is engaged by a drive belt or chain connected to a stepper motor affixed to the base. Affixed to the sprocket is a shutter plate having a plurality of notches in its perimeter for detection by an optical-indexing sensor. The apparatus also includes a carousel-indexing sensor and a cartridge-in-carousel and cartridge-orientation sensor. Disposed within the central cavity portion of the carousel unoccupied by cartridges is a cartridge onloading and offloading mechanism which is rotatably mounted concentric with the carousel-driving turntable. Disposed on a side of the carousel opposite the door is a dual tape drive assembly including modular tape drive units mounted to the base plate. The apparatus further includes a power supply, an associated electronic subsystem, and a cooling fan.

An important advantage of the present invention is that it provides a compact, large cartridge capacity, tape library system that is highly efficient in operation.

Another advantage of the present invention is that it provides a system configured to include a plurality of field-replaceable units (FRU), that make repair and replacement of parts simple and cost-effective.

Another advantage of the present invention is that it provides a system that includes fail-safe features which protect against both machine and operator error in cartridge placement and orientation.

These and other objects and advantages of the present invention will no doubt become apparent to those skilled in the art after having read the following detailed description of the preferred embodiment which is illustrated in the several figures of the drawing.

IN THE DRAWING

Figure 12:
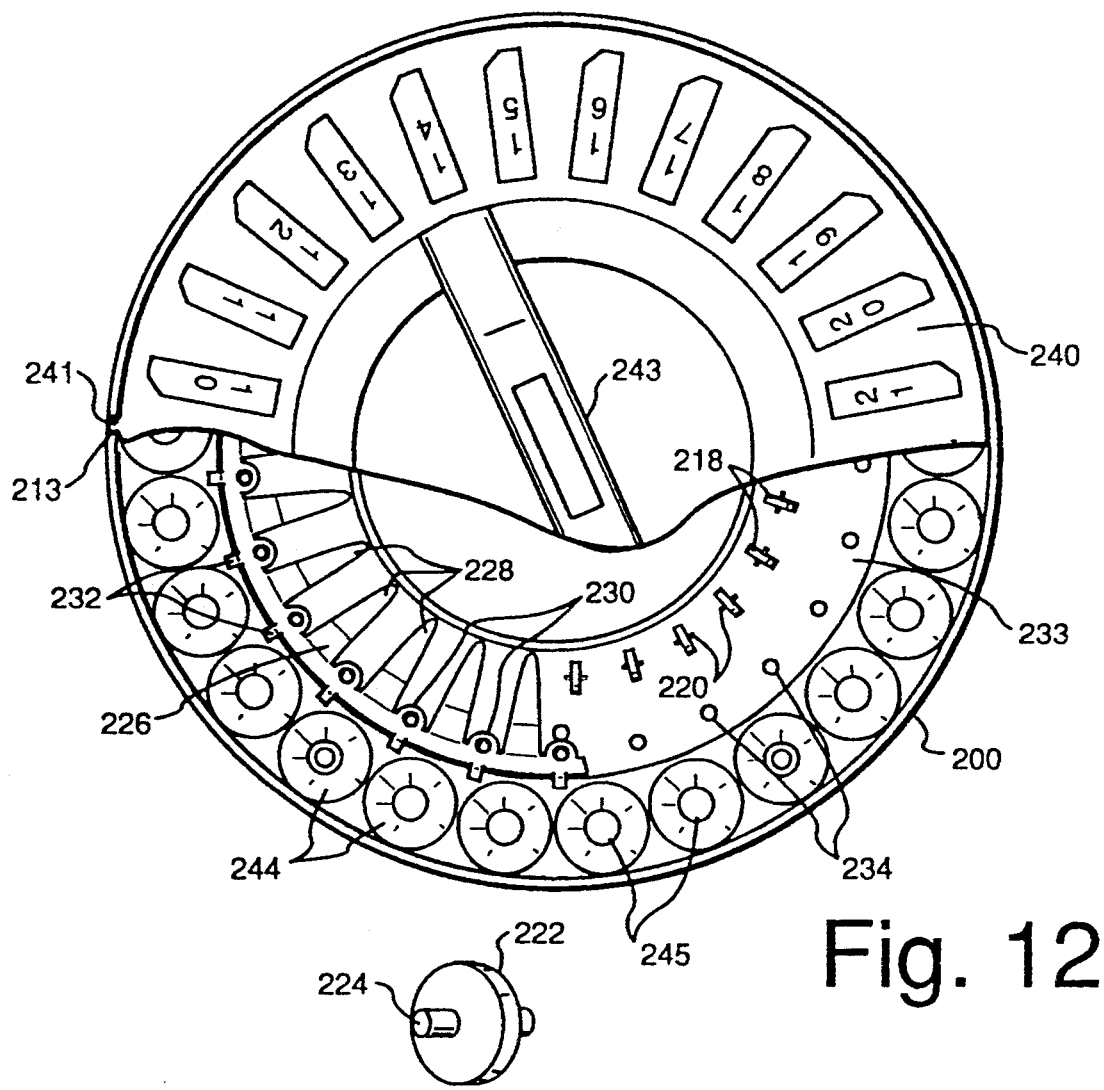
FIG. 12 is a partially broken plan view showing details of the opposite side of the molded part depicted in FIG. 9 together with a resilient retainer ring and cover plate in accordance with the present invention.
Figure 13:
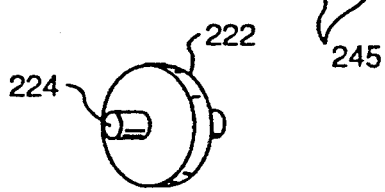
Figure 14:
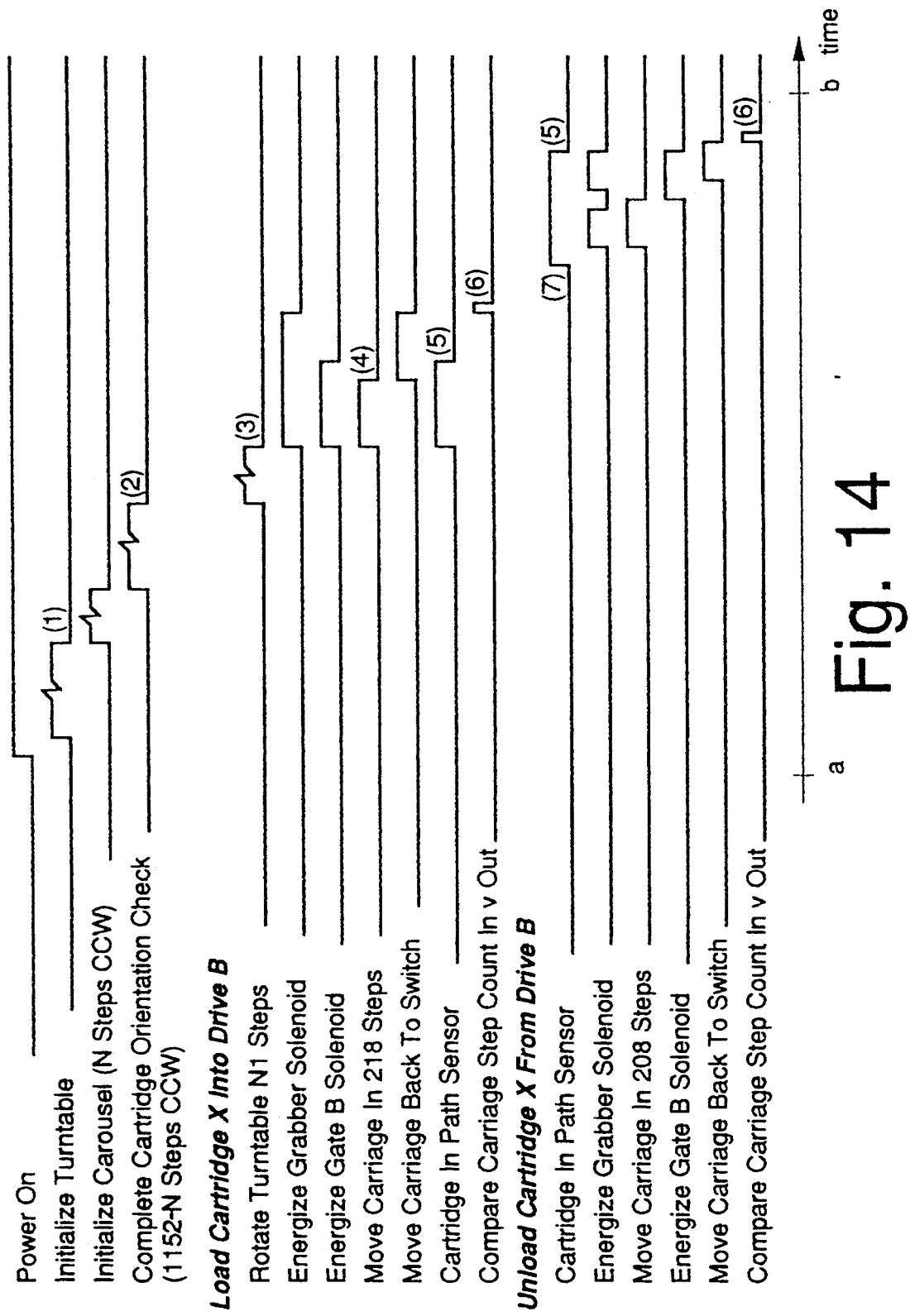
Figure 15:
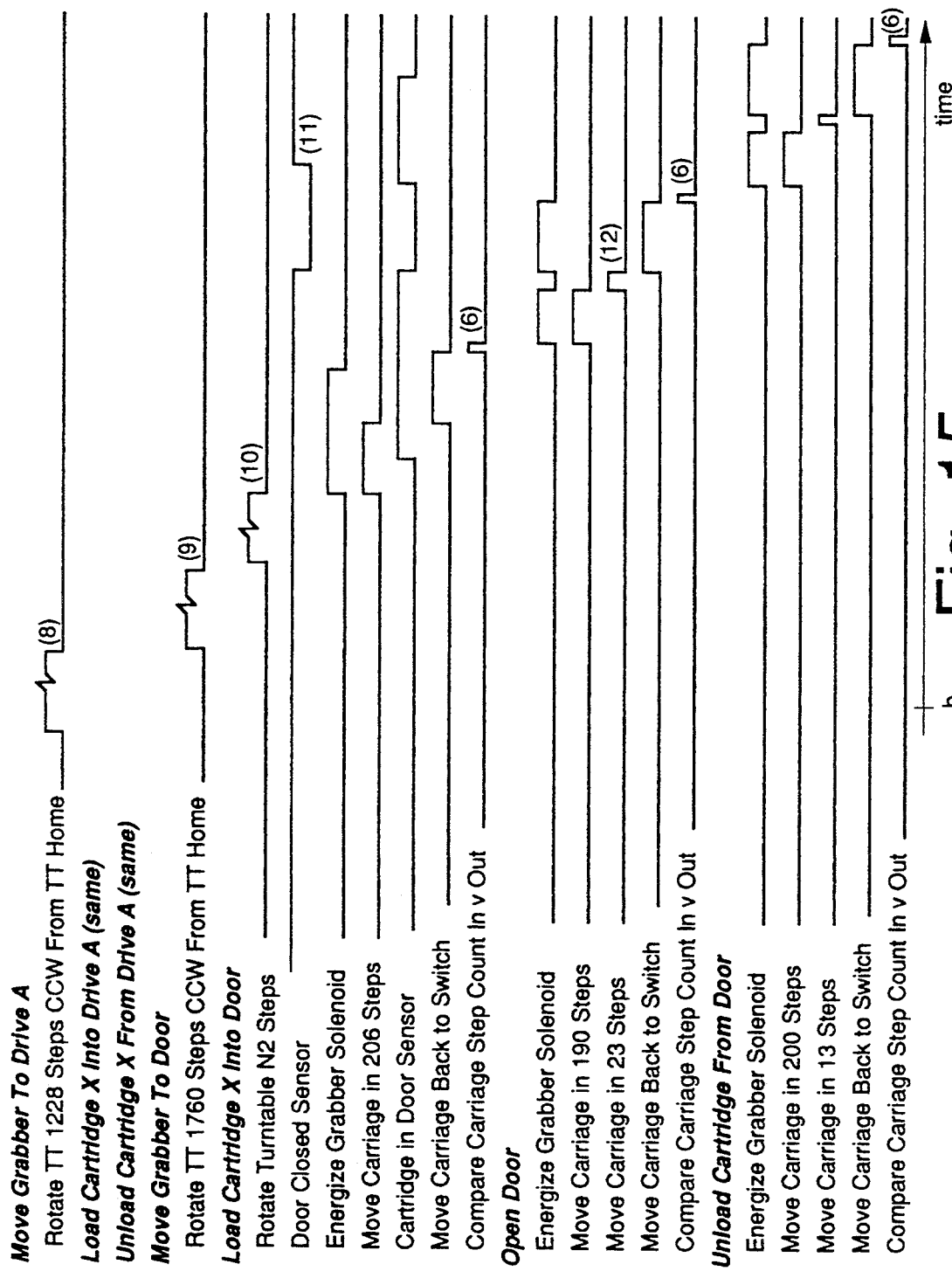

FIG. 13 further illustrates a roller wheel of the type depicted in FIG. 12 of the drawing; and FIGS. 14 and 15 illustrate operational sequences implemented by the illustrated preferred embodiment.

DETAILED DESCRIPTION OF A PREFERRED EMBODIMENT

Figure 1:
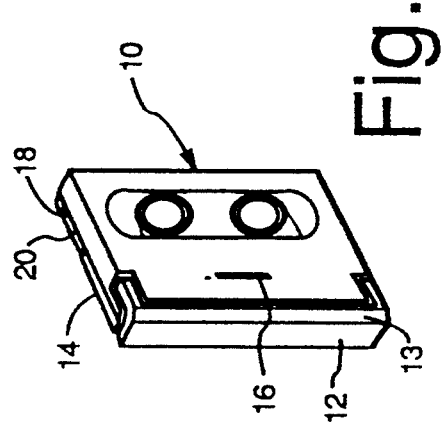
FIG. 1 is a perspective view illustrating details of a standard 4 mm helical scan magnetic tape cartridge.

Although not necessarily limited thereto, the preferred embodiment of the present invention is directed to an apparatus for handling helical-scan 4 mm data cartridges of the type depicted in FIG. 1 of the drawing. Access to the tape contained in the cartridge is through a rotatable gate 12 on one side of the cartridge body and a sliding panel 14 on the back side of the cartridge. Note that one edge 13 of the gate 12 is chamfered. Advantageously, the cartridge is provided with a handling slot 16 on the front surface, and a shoulder 18 is formed near the back side at the terminus of the panel slide relief 20. As will be explained in further detail below, the slot 16 and shoulder 18 will be engaged by elements of the present invention to retain it in position, first in the external access door and then in the carousel.

Figure 2:
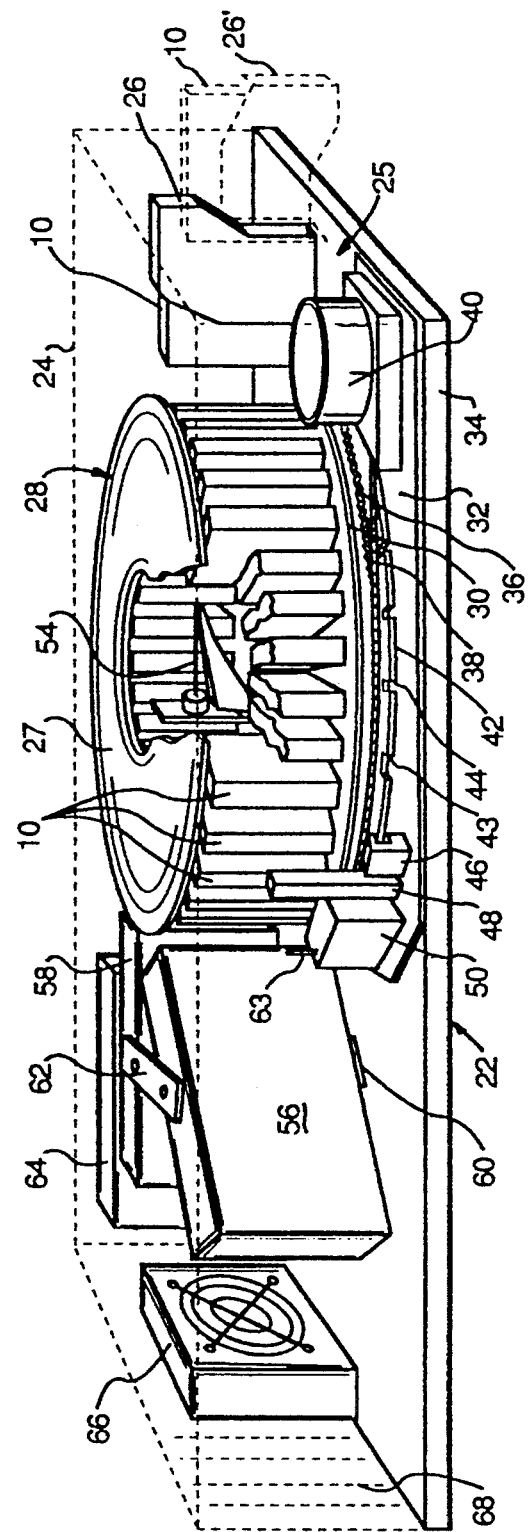
FIG. 2 is a perspective view generally illustrating the principal operative components of a tape library system in accordance with the present invention.

Referring now to FIG. 2 of the drawing, a preferred embodiment of the present invention is depicted generally at 22 with its outer casing removed but suggested by the dashed lines 24. The system includes an access door assembly 25, a pivotable cartridge-receiving door 26 for facilitating the insertion and removal of cartridges 10, and a cylindrical carousel unit 28 including a removable cylindrical cartridge-carrying magazine 27 carried by a turntable 30 rotatably mounted to a turntable support ring 33 (not shown) and plate 32 secured to the base casting 34. Turntable 30 includes a sprocket wheel 36 that is engaged by a toothed drive belt or chain 38 connected to a stepper motor 40 affixed to plate 32. Affixed to sprocket 36 is a shutter plate 42 having a plurality of notches 44 in the perimeter thereof for purposes which will be described below. Also attached to plate 32 is an optical turntable-indexing sensor 46, a carousel-indexing sensor 48, and a cartridge-in-carousel and cartridge-orientation sensor 50. Disposed within the central cavity of carousel 28 not occupied by the cartridges 10 is a cartridge onloading and offloading mechanism shown generally at 54. As will be described in detail below, the mechanism 54 is supported by a base (not shown) which is rotatably mounted concentric to the turntable 30.

Disposed on the side of carousel opposite door 26 is a dual tape drive assembly including modular tape drive units 56 and 58 which are mounted to base plate 34 by a drive-support casting 60 and associated clamp plate 62. A gate mechanism 63 is associated with each drive unit and positioned between its access slot and the carousel. Also depicted and mounted to base plate 34 is a power supply and associated electronics subsystem 64, and a cooling fan 66. Electronic access to drives 56 and 58 is by ribboned cables (not shown) and suitable connectors positioned at the ports indicated by the dashed lines 68.

Figure 3:
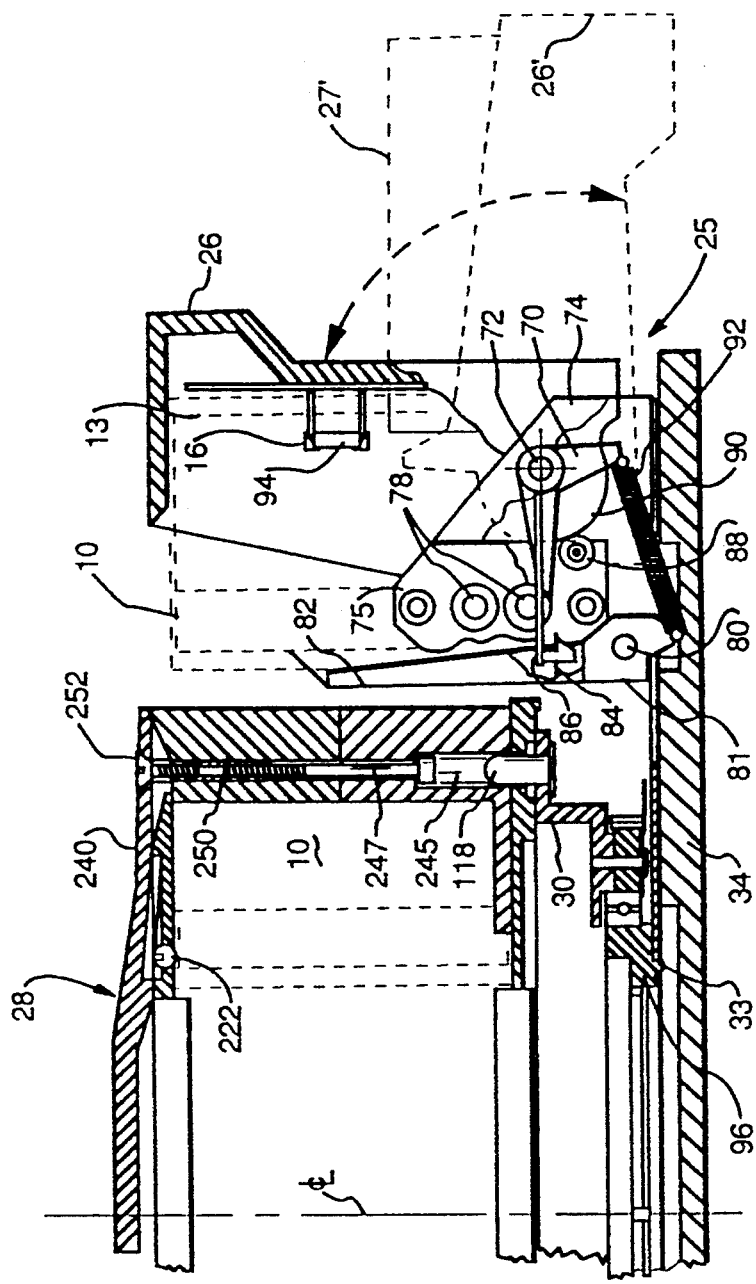
FIG. 3 is a broken, partial cross-sectional view illustrating details of the access door and carousel structure of the system depicted in FIG. 2.

In FIG. 3 of the drawing, details of the access door assembly 25 and its operating mechanisms are depicted in broken-away detail. Also depicted by the dashed lines 10 is a cartridge shown in place within door 26. The access door 26 and an associated lifter 70 are pivotably connected at 72 to a pair of upstanding side plates 74 mounted to base 34. Also affixed to side plates 74 is an optical detector assembly 75 including a pair of LEDs 76 (not shown) mounted on one side of door 26 opposite a pair of photosensors 78 aligned therewith and mounted on the near side of door 26, as depicted. Pivotably secured at 80 to side plates 74 is a trip lever 81 having a pair of spaced-apart arms 82 extending upwardly on opposite sides of the cartridge 10. The trip lever 81 includes a latch plate 84 extending horizontally and having an opening formed therein for matingly receiving a latch 86 affixed to door 26.

Also affixed to side plates 74 is a rubber roller 88 which is engaged by the lower edge 90 of door 26 and serves to provide a damping resistance to the opening of the door as well as a stop at both the open position indicated by the dashed lines 26', and the closed position illustrated Note that the bottom-most extremities of lifter 70 and trip lever 81 are attached by a tension spring 92 that serves both to maintain latch 86 in engagement with latch plate 84, when door 26 is in its closed position, and to provide partial opening energy to lifter 70 when trip lever 81 is rotated clockwise, as depicted, allowing latch 86 to become disengaged from latch plate 84 and permitting door 26 to be rotated outwardly about pivot 72. Rotation of lifter 70 is limited. Therefore, spring 92 only provides partial opening of door 26. Full rotation thereof into the open position indicated by dashed lines 26' is manually accomplished by an operator.

In order to ensure that a cartridge 10 is correctly oriented in door 26, a small bail-mounted roller 94 is provided on one side of the door. The bail is spring-loaded to extend a fixed distance into the opening at the door. If the cartridge is correctly oriented, the roller will engage the chamfer on the front edge of the cartridge, and be moved aside to allow the cartridge to enter until the roller drops into the slot 16, whereupon roller 94 serves to retain the cartridge in proper position relative to the door. Should a cartridge be incorrectly oriented, roller 94 will engage an unchamfered corner and prevent its entry into the door. Note that this simple bail-mounted roller takes advantage of two standard features of the cassette; namely, the chamfer 13 and slot 16, to provide both correct orientation of the cartridge, and retention of a cartridge correctly oriented in the door 26 as it is rotated from an open position to a closed position, and vice versa.

Figure 4:
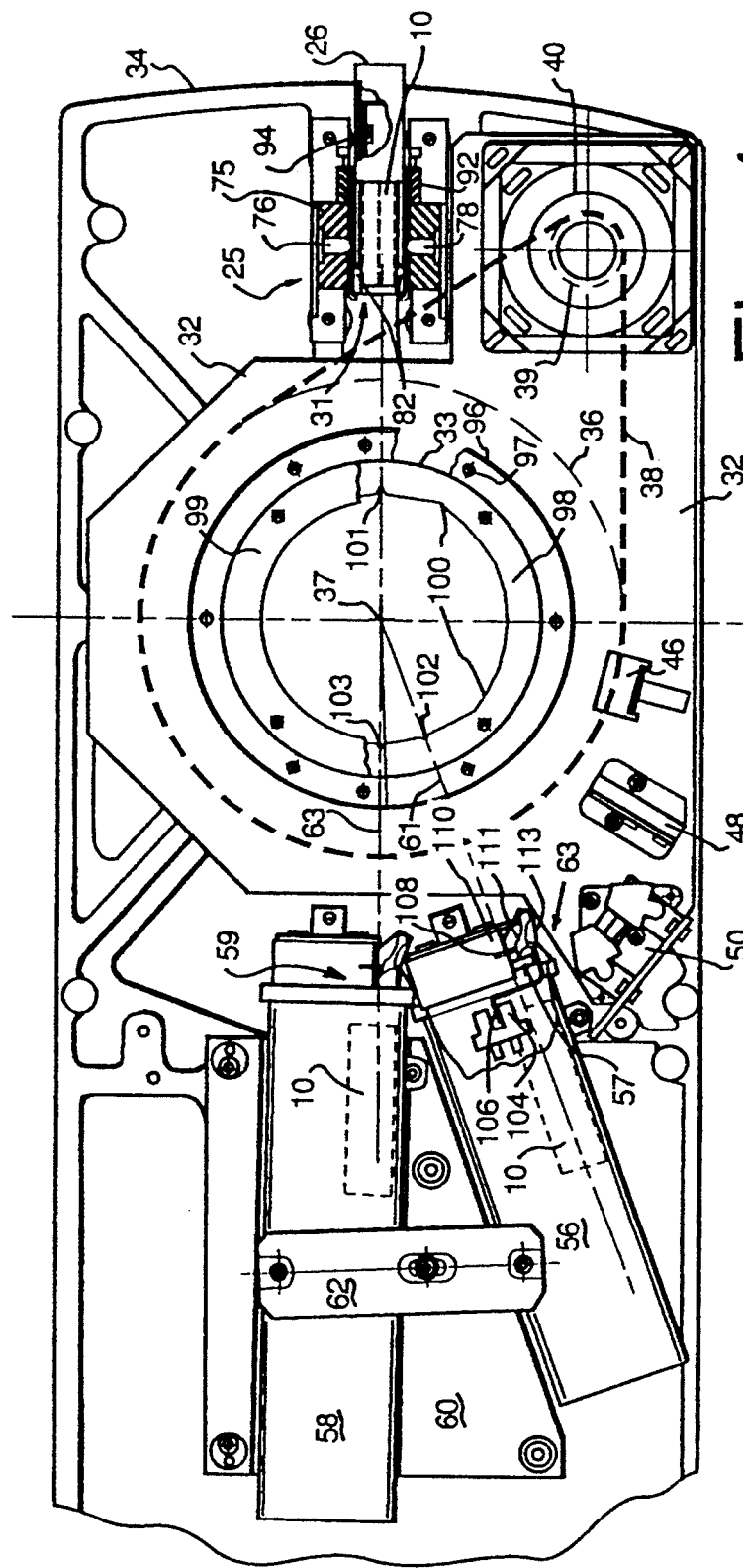
FIG. 4 is a plan view illustrating various details of the preferred embodiment depicted in FIG. 2 at the turntable plate level.

In FIG. 4, a partially broken top view of the access door assembly 25 is shown affixed to base 34 and juxtaposed to motor 40 and turntable plate 32. Note that turntable plate 32 has a central opening 95 formed therein for receiving a support ring 96 having a hole-forming perimeter including three V-shaped notches 101, 102 and 103, the purpose of which will be described below. Also depicted in this figure is a plan view of the drive-support casting 60 and its associated clamp plate 62. The front portion of drive 56 is broken away to reveal elements of the gate mechanism 63 including an optical switch 104 for detecting the position of a flag 106 that forms the lower end of a tortuously shaped gate lever 108 that will be further illustrated and described below. The gate 108 is actuated by solenoid 110 and return spring 111 that will likewise be described below. Although only partially depicted, a similar gate mechanism is also associated with drive 64.

Also illustrated in FIG. 4 is the alignment of the cartridge-receiving/exiting opening 31 of access door mechanism 25 and the cartridge-receiving openings 57 and 59 of the drives 56 and 58 relative to the turntable support ring 96. As suggested by the lines 29, 61 and 63, the several units are aligned such that the centerlines of the cartridge-receiving chambers of each unit lie along radial lines emanating from the center 33 of turntable support ring 96 and thus the center of turntable 30.

Figure 5:
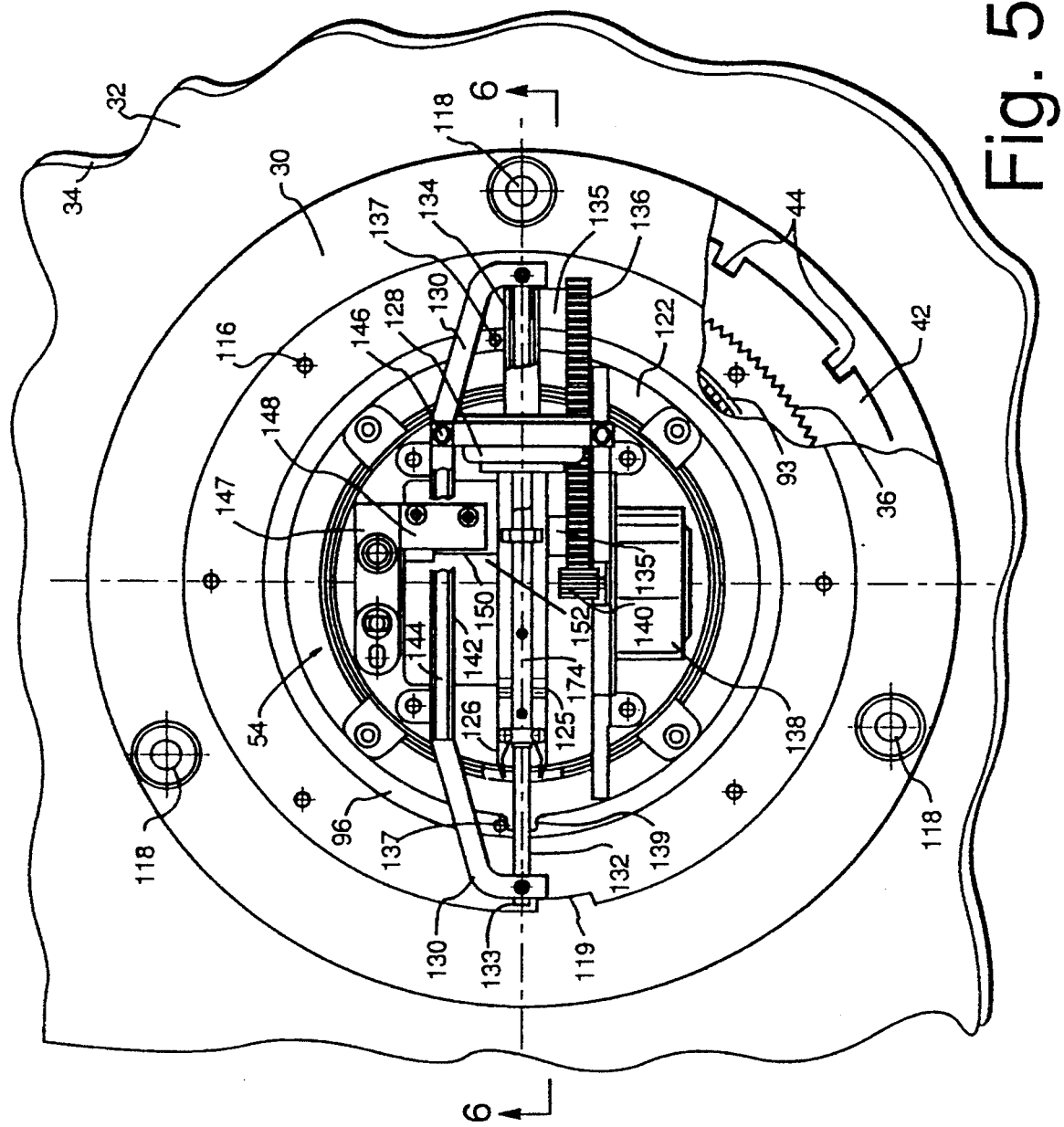
FIG. 5 is a partially broken plan view illustrating various details of the turntable, cartridge grabber and carriage subsystems of the preferred embodiment.
Figure 6:
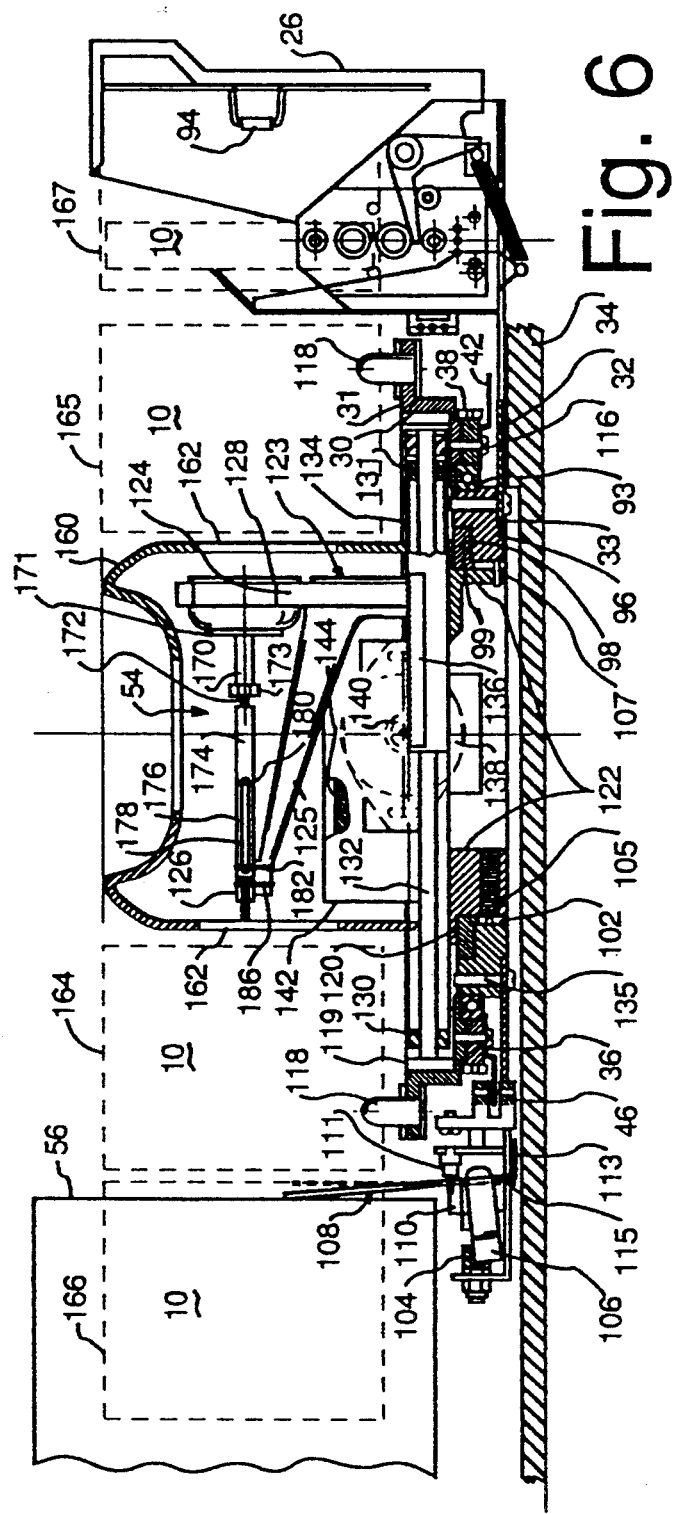
FIG. 6 is a partially broken cross-section taken along the line 6—6 of FIG. 5.

Depicted in FIG. 5, and in the cross-section thereof taken substantially along the lines 6—6 and depicted in FIG. 6, is the turntable assembly 30 and cartridge load-/offload mechanism 54. As illustrated, the support ring 96 is mounted within the opening 33 in turntable plate 32 and includes a recessed ledge 98 (FIG. 6) for receiving an annular bushing 99. As suggested in FIG. 5 and more clearly shown in FIG. 6, sprocket 36 is journalled to support ring 96 by an annular bearing 93. Mounted to sprocket 36 and affixed thereto by screws 116 is the turntable 30 including three upstanding drive pins 118 disposed at equal intervals around the perimeter thereof. In the inner wall of turntable 30 a protrusion is provided to form a stop 119. It will be appreciated that turntable 30 is thus freely rotatable about bearing 93 or driven by motor 40 via belt 38 and sprocket 36.

Disposed to extend downwardly through the inner opening of bushing 99 and having an outwardly extending shoulder 120 for resting thereupon is a base structure 122 for the cartridge loading/offloading mechanism 54, sometimes referred to as a "grabber mechanism" or "grabber assembly". Mounted to base 122 is a carriage assembly 123 including an upstanding support member 124 and an outreaching support arm 125 for supporting a grabber 126 and its actuating solenoid 128. Also affixed to base 122 is a yoke 130 for supporting each end of a guide rod or shaft 132. Slidably affixed to guide rod 132 is the base portion 134 of support 124 of carriage assembly 123. Also affixed to the base portion 134 by lateral offsets 135 (FIG. 5) is a rack 136. A carriage driving stepper motor 138 having a pinion 140 affixed to its drive shaft is mounted to base 122 to drivably engage rack 136 and move carriage 123 along guide rod 132. In order to prevent the carriage from rotating about guide rod 132, a slider rail 142 having a slot 144 formed therein is also affixed to base 122 for engagement by a slider pin formed by the distal end 145 of a mounting bolt 146. Disposed beneath rail 142 and secured to base 134 by switch-adjusting plate 147 is a carriage switch 148 having an actuator arm 150 which is engaged by a projection 152 extending from the carriage base 134.

Also shown in FIG. 6 is a grabber assembly cover 160 which rotates with the assembly and has an opening 162 formed in its cylindrical wall for permitting passage of carriage arm 124 and grabber 126 to engage a cartridge in any of positions illustrated by the dashed lines 164 and 165, the recorder position 166, and the access door position 167.

Further detail of the gate lever 108, its flag 106, the optical switch 104, the actuator 110, and a pivot pin 111 is illustrated in FIG. 6. Also shown is the turntable indexing optical switch 46.

Figure 7:
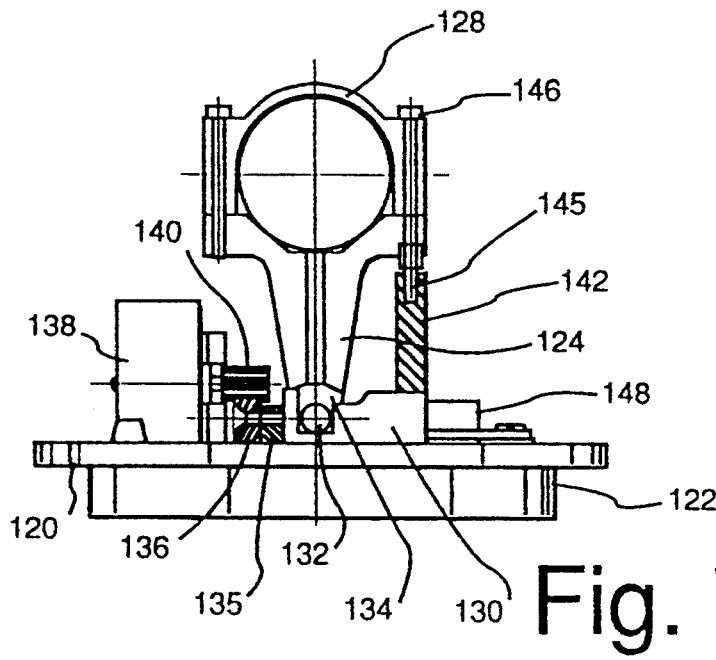
FIG. 7 is an elevational view illustrating certain details associated with the carriage drive components of the grabber subassembly of the preferred embodiment.

Reference is made to FIG. 7 to provide a better understanding of the relationship between stepper motor 138, pinion 140, rack 136, support 124, carriage base 134, guide rod 132, grabber actuator solenoid 128, guide rail 142, guide pin 145, and switch 148. Also illustrated is the cylindrical lower portion of base 122 and the shoulder 120 which slides upon the bushing 99 as depicted in FIG. 6.

Figure 8:
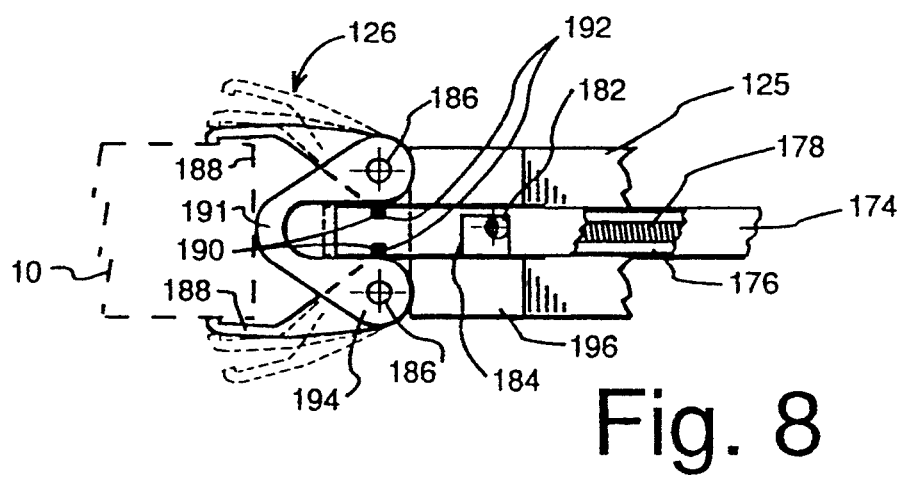
FIG. 8 is an exploded partial plan view illustrating details of the grabber elements depicted in FIGS. 5 and 6.

Referring now to FIG. 8 of the drawing, and additionally to FIGS. 5 and 6, details of the grabber mechanism per se will be disclosed. In FIGS. 5 and 6, it will be observed that an internally threaded shaft 170 is affixed to the armature plate 171 of actuator solenoid 128, and has threaded into the end thereof a threaded stud 172 (part of 174) with a lock nut 173 provided thereon for locking the stud relative to shaft 170. Integral with the shank of stud 172 is a puller bar 174 having a longitudinal slot 176 (FIG. 6) formed therein, and a spring 178 disposed within slot 176. Spring 178 has one end pinned to bar 174 at 180 and the other end pinned to carriage arm 125 by a pin 182 that extends upwardly through a vertically oriented slot 184 (FIG. 8). Note that the function of spring 178 is to apply a resilient biasing force tending to pull rod 174 away from actuator 128, opening the grabber fingers.

Extending through the end portion of the carriage arm 125 on either side thereof are pins 186, the two pins serving as pivots for a pair of cartridge-grabbing fingers 188. As best shown in FIG. 8, each of the fingers have a radially extending tooth 190 provided thereon for engaging a corresponding notch 192 in the end portion of puller bar 174. A plastic nose plate 194 cooperates with the upper surface 196 of carriage arm 125 and the fingers 188 to form a capture for the distal end of puller bar 174 and provide a nose 191 for engaging a cartridge 10.

It will be appreciated that by rotatably adjusting the shaft 172 and locking it in place with nut 173, the rest position of puller bar 174, and thus the spread of fingers 188 in the illustrated gripping position, can be selected. Any spreading of the fingers 188 will tend to pull puller bar 174 away from actuator 128 but will be resisted by spring 178. Accordingly, anything wider than the illustrated distance between the tips of fingers 188 will be gripped with a force determined by spring 178. Upon actuation of solenoid 128, bar 174 will be moved toward solenoid 128 causing fingers 188 to be rotated inwardly to the illustrated cartridge gripping position.

Figure 9:
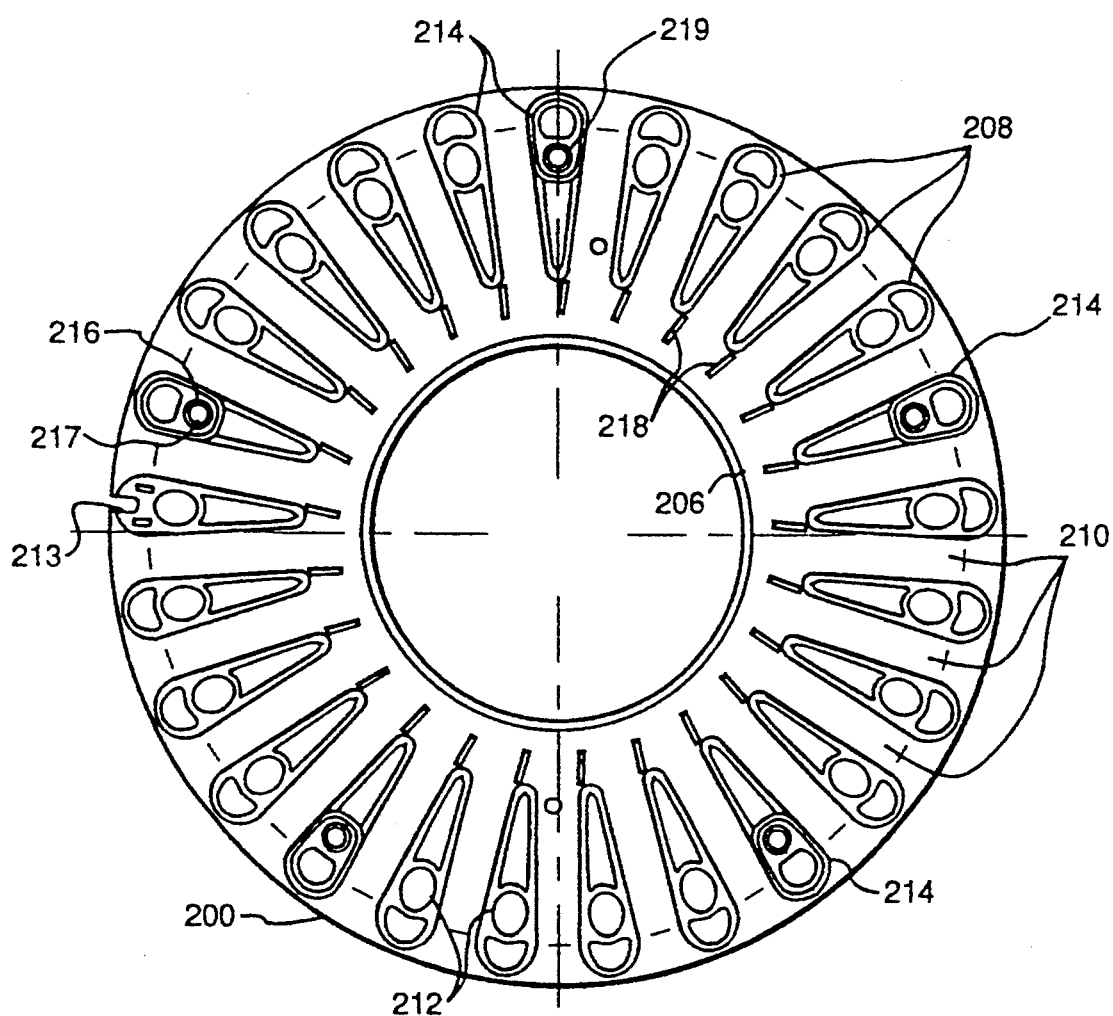
FIG. 9 is a plan view showing one side of a molded part used to form the carousel-type magazine unit of the preferred embodiment.
Figure 10:
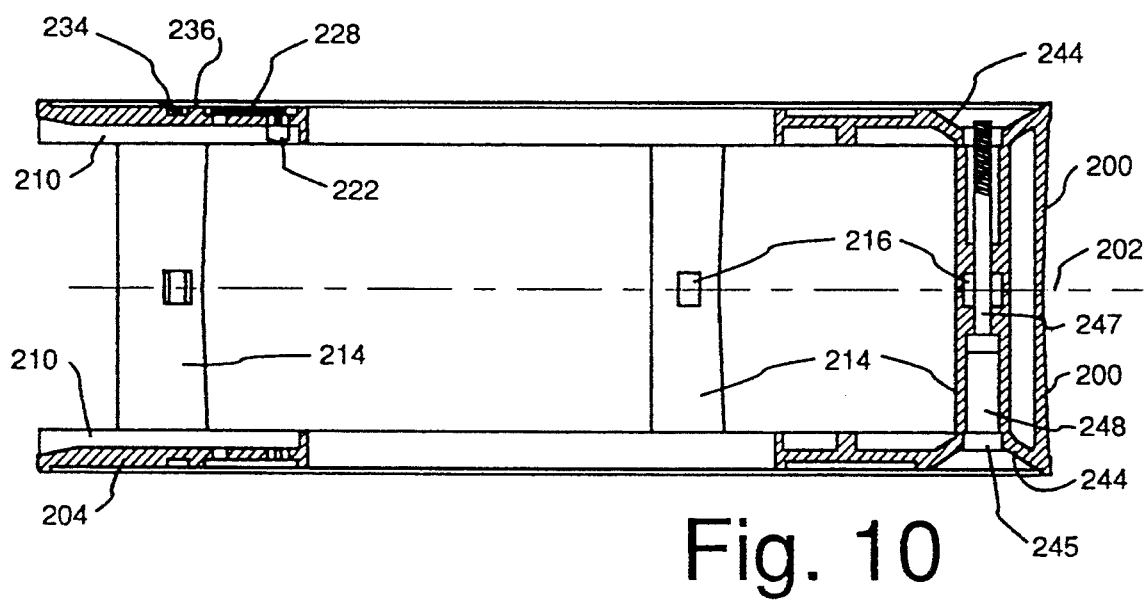
FIG. 10 is a transverse cross-section depicting certain details of a preferred embodiment of a carousel-type magazine in accordance with the present invention.

Referring now collectively to FIGS. 9, 10, 11 and 12, the various component parts of a carousel magazine unit in accordance with the present invention are illustrated. The carousel magazine unit is comprised of two identical molded parts 200 stacked face to face and joined at the line 202, as depicted in FIG. 10. Each part is comprised of a base portion 204 having a circular aperture 206 formed concentric therewith and including a plurality of divider elements 208 defining cartridge-receiving slots 210 and oval-shaped receptacles 212 for receiving the drive pins 118 depicted in FIGS. 5 and 6. In addition, five of the dividers include stand-off elements 214 (FIG. 10) having half-round tabs and slots formed at their distal ends which serve as mating keys when two of the units 200 are mated together as depicted in FIG. 10. Note that the standoffs 214 are bored and counterbored to receive a bolt 247 for locking the two parts together. Each part likewise includes a plurality of small slots 218 each positioned in alignment with a side portion of a slot 210 (FIG. 9) and having a vertical transverse slot 220 entering the opposite side as depicted in FIG. 12. Disposed within each of the slots 218 is a small pinwheel-shaped object, such as that depicted in FIG. 13, comprised of a small metal or molded plastic wheel 222 with integral shafts 224. The wheels 222 fit into slots 218, and the shafts 224 fit in slots 220.

A metal retainer plate 226, having a plurality of inwardly directed spring fingers 228, aperture tabs 230 and outwardly extending tabs 232, is positioned over the annular depressed region 233 formed on the opposite side of the upper part 200, and the tabs 230 are forced over the standing studs 234 such that the apertures in the tabs frictionally engage the studs and the tabs 232 interfere with the shoulder forming the depression 233, thereby biasing the fingers 228 flat against the surface of 233. The spring fingers thus engage the tops of the wheels 222 forcing them downwardly so as to protrude into the cartridge-receiving slots 210. Retaining engagement of a wheel 222 with a cartridge is depicted in FIG. 3.

Figure 11:
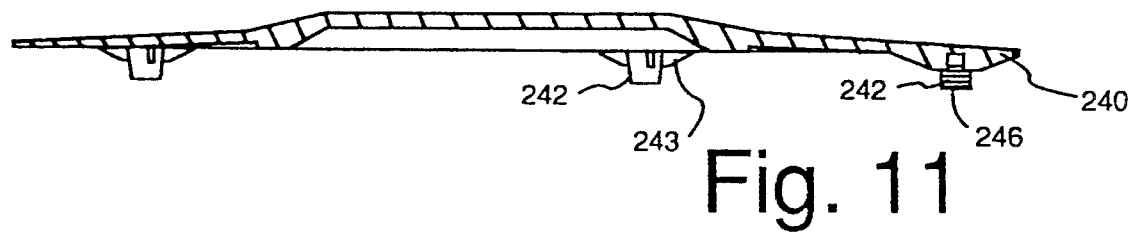
FIG. 11 is a transverse cross-section illustrating details of a carousel-type magazine cover plate in accordance with the present invention.

In FIG. 11, a carousel cover and lifting handle plate 240 is depicted showing three of five short downwardly extending legs 242 and webs 243 for engagement within the frusto-conically shaped recesses 244 formed in the outer side of the parts 200, depicted in FIGS. 10 and 12. In order to secure the top to the carousel parts 200, rough threads can be formed in a bore 246 extending into the bottom side of legs 242 for engagement by a bolt extended through the bores 248 formed in the stand-offs 214. Alternatively, as depicted in FIG. 3, a bored insert or sleeve 250 could be positioned in the bores 248 of the upper parts 200 for threadably receiving screws 247 extending up through the bottom-most parts. The top 240 could be likewise secured thereto by threading a screw 252 into the sleeve 250.

Having thus described the component parts of the preferred embodiment, the following summary is offered to provide an understanding of how the several parts interact.

Referring again to FIG. 2 of the drawing, a carousel 28 is provided which is less than 8 inches in diameter and holds 25 4 mm cartridges. As previously described and depicted in FIGS. 9–12, identical injection-molded plastic parts 200 are used for both the top half and the bottom half of the carousel body. On the facing surfaces of the two parts, as indicated in FIG. 9, features are provided which locate and guide the cartridges. Twenty of the features 214 are of minimum height while five of the features include stand-offs that extend to the midplane of the magazine. Projections from these longer features, or standoffs, locate and orient the two halves.

As indicated in FIG. 9, a notch 213 extends radially inwardly through one of the minimum-height features. The notch 213 in the bottom part is sensed by the angled LED and optical sensor 48 (FIG. 2) to establish a carousel index. The corresponding notch 213 in the top half of the magazine is used to orient the top cover 240. More specifically, a tab 241 in cover 240 mates with the notch 213, as depicted in FIG. 12. Due to the orientation of the various parts, features and notches, the magazine can only be assembled in one way. The slotted holes 245, best shown in FIG. 12 but also designated as 212 in the lower part 200 shown in FIG. 10, have frusto-conical lead-ins 244, which in the case of the lower part serve to facilitate engagement with the three pins 118, shown in FIGS. 5 and 6.

The magazine 28 can thus be easily installed in the library unit without regard to angular orientation. The weight of the magazine holds it in engagement with the turntable flange, as partially depicted in FIG. 3 of the drawing. The pins 118 and slotted holes 245 also accurately center the magazine on the turntable 30 and transmit torque from the turntable to the magazine.

As variously depicted in FIGS. 3, 10 and 12, twenty-five small rollers 222 with integral axis 224, as depicted in FIG. 13, fit in narrow elongated holes and slots 218 and 220 (FIG. 12) molded into the carousel parts 200. However, the rollers are only installed in the top part. The self-retaining one-piece spring 226, shown in FIG. 12, has twenty-five fingers 228 which engage and hold the rollers 222 in place and provide independent spring action. As depicted in FIGS. 3 and 10, part of each roller 222 protrudes into the slot to be occupied by a cartridge. The protruding part of the roller fits into a relieved portion of the cartridge and thereby holds the cartridge securely within the magazine slot. The injected-molded plastic top cover 240 covers the spring 226 and rollers 222 and includes a handle 243 that bridges the central opening of the magazine. Cartridge identification numbers are molded into the cover 240, as illustrated, so as to identify each of the twenty-five cartridge slots.

As depicted in FIGS. 3 and 10, the magazine halves and top are all held together with five screws 247 which are installed from the bottom.

As best depicted in FIGS. 5 and 6, a flanged cast-aluminum turntable 30 rotates on the outer diameter of a thin cross-section X-type ball bearing 93, and a six-inch pitch diameter sprocket 36 is sandwiched between the turntable and a notched shutter plate 42. The sprocket 36 fits against the outer race of the bearing, and a stepper motor 40 (FIGS. 2 and 4) drives the turntable 30 via a positive-drive, no-backlash belt 38 and sprocket wheel 39. The sprocket ratio is selected so that $$\text{RATIO} = (\text{no. cartridges}) \times (4n/(\text{steps/rev}))$$

where n is an integer. As illustrated in FIG. 2, shutter plate 42 has one large notch 43 and twenty-four smaller notches 42. The optical switch 46 fits around the shutter plate to sense passage of the notches 42 and 43. The large notch 43 and a specific phase of motor 40 establish the turntable index. The control system calculates the offset between the turntable index and the carousel index during initialization. The small notches verify turntable rotation. The angular position of turntable 30 is factory-adjusted by rotating the motor 40. The inner race of bearing 96 is fixed to a cylindrical aluminum support member 96 which has a pilot diameter 100, as depicted in FIG. 4, and fits within a hole in the sheet metal turntable mounting plate 32. The mounting plate 32 has a datum hole and slot (not shown) that fit pins (not shown) provided in the base plate 34. The turntable assembly including the drive motor 40 is a field-replaceable unit (FRU).

The large cylindrical plastic bushing 99 (FIGS. 4 and 6) fits in a recess on top of the support 96. As depicted in FIGS. 4 and 6, the surface 100 forming an edge to the support surface 99 is irregular and is provided with three V-shaped notches 101–103. Two of the notches, 102 and 103, are respectively aligned with the tape drives 56 and 58. The third notch, 101, is aligned with the access door 26. As depicted in FIG. 6, the cast-aluminum grabber base 122 has a flange 120 and a cylindrical projection extending downwardly. The grabber base 122 fits in and rests on the plastic bushing 99. Bushing 99 allows the grabber base to rotate independent of, but concentric with, the turntable 30 with little friction or wear. A spring-loaded plunger 105 (FIG. 6) protrudes in a radial direction near the bottom of the grabber base and will detent into one of the three notches in the support 96, thereby aligning the grabber base with the drives or the access door. The top of the grabber base has two arms 130 which extend from the base and hold the carriage guide rod 132. The arms and guide rod are positioned below the carousel mounting surface 31 of the turntable 30. Note that, as depicted in FIG. 5, one end 133 of guide rod 132 extends slightly beyond the limits of the arm 130. When the exposed end of the guide rod contacts the inward facing protrusion 119 on the turntable 30, the turntable can rotate the grabber base 122 to one of the three detented grabber positions. After rotating the grabber base, the turntable 30 is then free to rotate any of the cartridges into alignment with either the access door or one of the drives.

In accordance with the present invention, only one motor, i.e. motor 40 (FIGS. 2 and 4), is required since the turntable drive motor does double duty. More specifically, the grabber base 122 is prevented from rotating more than necessary (182.4°) by two pins 135 and 137 protruding from the top of the support 96, and a radial protrusion 139 from the grabber base flange 122. The grabber base 122 is held down by gravity. However, it cannot be removed unless the plunger 105 and an opposing pin 107 are aligned with notches (not shown) formed in the bushing 99. The grabber assembly 54 is also a field-replaceable unit (FRU). Advantageously, the turntable/grabber base assembly is very compact, i.e. only slightly over an inch thick. As an alternative to the embodiment shown, the turntable, sprocket, pins and bearing could be combined in one injection-molded part.

The carriage including arm 124 is a cast-aluminum part having bronze bushings 131 (FIG. 6) and, as previously indicated, is driven along the guide rod or shaft 132 by the small stepper motor 138, a pinion 140 attached to the motor shaft, and a rack 136 forming a part of the carriage. The motor and pinion are selected to provide sufficient force to load a cartridge into the tape drives 56 and 58 (FIG. 4). As previously described, carriage rotation is prevented by the pin 145 sliding in a slot 144 (FIGS. 5 and 7). The lower part of the carriage has a projection 152 (FIG. 5) that contacts the switch arm 150 of switch 148 when the carriage is in the retracted position. The retracted position of the switch is factory-adjusted.

The carriage supports a low-profile solenoid 128, the center of which is in line with the center of cartridges disposed in the carousel. The solenoid plunger is adjustably connected to the rectangular puller bar 174 by means of the threaded assembly 170, 172, 173 (FIG. 6). Puller bar 174 has two vertical grooves or notches 192 (FIG. 8) provided therein at the end opposite the solenoid. The two small rotatable grabber fingers 188 are pivotably secured to carriage arm 125 by pivot pins 186 and have protrusions 190 that fit in the grooves 192. When the puller bar is moved a small distance (approximately 0.029 inch) by solenoid 128, the grabber fingers rotate towards each other in a pincer motion. When solenoid 128 is not energized, the tips of the fingers 188 are held normally open by the small spring 178 (FIGS. 6 and 8) attached to the puller bar and carriage arm 125.

The spacing of the closed tips of the grabber fingers 188 is normally adjusted to be approximately 0.05 inch less than the thickness of a cartridge to be engaged. The maximum separation of the closed grabber fingers is selected so that the overall width thereof is less than the minimum spacing between cartridges as they are placed in the carousel. Therefore, when the solenoid 128 is energized, the closed ends of the grabber fingertips can be used to push a cartridge out of the carousel and into a tape drive or the access door. With the grabber fingertips open they easily fit around a cartridge. When the grabber is open and solenoid 128 is energized, the grabber fingertips can firmly grip a cartridge so that it can be drawn into the carousel from the tape drive or the access door. As illustrated in FIG. 8, the grabber fingers and puller bar are captured by plastic guides 191 designed to form a "nose" for contacting a cartridge when the cartridge is in a grabbable position.

The carriage, solenoid and motor forming the mechanism 54 all fit within the central opening of the carousel magazine. The rack and bushing portion of the mechanism are positioned below the carousel. Although prototype grabbers were made by stacking photo-etched parts, it is anticipated that production parts will be fabricated of sintered steel. The prototype carriage is designed as a machined aluminum casting with bushings, but the rack 136 is made of steel. Alternatively, the carriage rack and bushings could be combined in a single injection-molded plastic part.

The downwardly pivoting access door 26 provided at the front of the unit has an opening axis that is perpendicular to the axis of the carousel. The door is made of injection-molded plastic and, when open, will accept a correctly oriented cartridge. As previously described, the cartridges have a small chamfer on one of the leading edges, and, if oriented correctly, the chamfer will move the small spring-loaded roller 94 (FIGS. 3 and 6) out of the way. However, once the cartridge is loaded, the roller 94 assists in holding the cartridge in the door. The door is closed by hand and has a front surface that, when the door is closed, is flush with the front panel of the unit. The two LEDs 76 (FIGS. 3 and 4) and two sensors 78 monitor door open/close and cartridge present. The latch 86 engages trip lever 82 when the door is fully closed. The trip lever 82 may be rotated about an axis 80 parallel to the axis 72 of the door 26 when engaged by the tips of the grabber fingers, thereby allowing the spring-loaded lifter 70 to apply a limited rotation torque to open the door. The lifter rotates about the same axis as the door. The same spring, i.e. spring 92, is used to apply force to the lifter and the trip lever.

The upwardly extending legs forming the upper portion of the trip lever 82 are spread far enough to fit around a cartridge. Moreover, the spacing between the legs is made wide enough for the grabber fingers to pass through when closed but narrow enough to insure that they are engaged by the ends of the grabber fingers when the grabber solenoid is de-energized. To pull a cartridge out of the door and into the carousel, the grabber is extended with its fingers closed until the tips are past the legs of the trip lever. The solenoid 128 is then de-energized allowing the spring 178 (FIG. 6) to expand the grabber fingers to the grab position. Solenoid 128 is then again energized and the cartridge is engaged by the fingers and withdrawn into the carousel by energizing stepper motor 138.

To offload a cartridge from the carousel to the door, the closed fingertips are caused to engage the cartridge exterior and push the cartridge out of the carousel and through the legs of the trip lever 82 into the door 26. To then open the door, the carriage is withdrawn far enough for the closed grabber fingertips to clear the trip lever 82, and solenoid 128 is de-energized, allowing the tips to open. The carriage is then moved outwardly far enough to engage and rotate the trip lever toward the door to release the latch and allow the door to be rotated outwardly under the influence of spring 92 and lifter 70. The door initially rotates about 20° under action of the lifter with the rubber roller 88 (FIG. 3) contacting cam surface 90 in the bottom of the door and gently stopping the partially opened door. The upper corner of the door at this point protrudes far enough from the front of the unit for an operator to grip it and pull it open. The rubber roller/cam prevents the door from falling open and provides soft stops when the door is opened and when it is closed. The door assembly is a field-replaceable unit (FRU) and is installed without adjustment.

The library unit of the present invention is designed to be used with unmodified tape drives available from several vendors. 4 mm tape drives normally are auto-load and auto-eject (similar to most VCRs). To load, the cartridges are inserted in a slot in the drive and pushed partway into the drive against a spring. The cartridges are automatically unloaded but are not ejected a fixed distance. This is to say that the ejected extension of the cartridge out of the drive varies from drive to drive. In accordance with the present invention, the gate mechanism (best shown in FIG. 6) is used to:

(1) stop the cartridge at a controlled location clear of the magazine exterior;
(2) indicate that a cartridge has been ejected and is ready to be pulled into the carousel magazine; and
(3) check that the cartridge path is clear before rotating the carousel.

As depicted, the gate lever 108 extends up from a pivot point 111 below the carousel to just below the midpoint of a cartridge 10. The lever can rotate about an axis parallel to the cartridge motion and also has limited rotation about an axis normal to the cartridge motion. A single, angled spring 113 below the pivot 111 rotates the top of the lever about the pivot both toward the tape drive and toward the cartridge slot in the drive. The top of the lever has a projection which protrudes in front of the cartridge slot. The small solenoid 110 connected to the lever below the pivot 111 has an actuating axis normal to the direction of cartridge motion. The flag portion 106 of lever 108 extends from the lower part of the lever below the pivot 111 into a position between an optical switch 104 that fits around the end of the flag. The flag portion 106 of the lever is designed so that rotation about either of the two orthogonal axes defined by pin 111 and actuator 110 will block the optical switch. The optical switch is normally open (not blocked).

When solenoid 110 is energized, it causes the top of lever 108 to rotate away from the cartridge slot. This rotation causes the flag end 106 to block the optical switch 104. When the cartridge slot is clear, a cartridge can be pushed from the carousel into the drive. After the cartridge is loaded, the solenoid is de-energized allowing spring 113 to position the upper end of lever 108 in front of the drive opening. When the drive ejects the cartridge, the cartridge contacts the projection at the top of lever 108, and since the cartridge unload spring in the drive is stronger than the lever spring, the cartridge causes the lever to rotate rightwardly against a stop 115 at the bottom end of the lever. Lever rotation caused by the unloaded cartridge also causes the flag end 106 to block the optical switch 104. With the cartridge now in a known position, the grabber carriage is moved out through the carousel and extended until the grabber nose 191 contacts the cartridge and partially re-inserts it into the drive. At this point, the cartridge is no longer pressing against the lever, and the gate solenoid 110 can be energized to move the gate out of its blocking position. After the gate is clear of the cartridge, actuator 128 is energized and the cartridge is engaged by the grabber fingers and is withdrawn out of the drive and into a carousel slot, and the solenoid 110 is de-energized, allowing the lever 108 to move back into position in front of the drive unit. If the cartridge was not successfully pulled into the carousel, the lever 108 will rest against the cartridge and not return to its normal position. In this position, the optical switch 104 is blocked, indicating that a retry is required. The cartridge gate mechanism is a field-replaceable unit (FRU) and requires no adjustment.

A typical operational sequence is illustrated by the timing diagram shown in FIGS. 14 and 15. However, many variations to the illustrated sequence can be orchestrated by the system controller electronics and associated software. The numbers indicated in FIGS. 14 and 15 are defined by the following list:

(1) Grabber aligned with Drive B. Turntable in home position.
(2) Grabber aligned with Drive B. Slot XX aligned with drive B.
(3) Target cartridge aligned with drive B.
(4) Target cartridge should be in drive B.
(5) If CIP sensor stays on, initiate retry procedure.
(6) If STEPS OUT≠STEPS IN, initiate retry procedure.
(7) Drive ejects cartridge.
(8) Grabber aligned with drive A.
(9) Grabber aligned with door.
(10) Target cartridge aligned with door.
(11) Operator closes door.
(12) Target cartridge in door.

Although the present invention has been described above in terms of a specific embodiment, it is anticipated that alterations and modifications, and perhaps other uses thereof will become apparent to those skilled in the art. For example, the unit may be modified to load VHS video cassettes, audio cassettes, or other media packages into corresponding drives. It is therefore intended that the following claims be interpreted as covering all such alterations and modifications as fall within the true spirit and scope of the invention.

What is claimed is:

1. An automatic library system for handling cartridges containing recorded media, comprising:
   carousel means including turntable means and media-carrying magazine means carried by said turntable means, said magazine means including a plurality of cartridge-receiving slots oriented to lie along radial lines emanating from the axis of rotation of said carousel means, said slots being arrayed in an annular band surrounding said axis of rotation and defining a central chamber;

means forming a plurality of cartridge-loading/unloading stations disposed around said carousel means;

at least one media drive unit disposed at one of said loading/unloading stations for receiving a cartridge and reading data from or writing data to the media contained therein, said media drive unit having a cartridge-receiving opening;

drive means for rotatably driving said turntable means; and cartridge-loading/unloading means disposed in said central chamber for engaging a cartridge in said magazine and pushing it out of said magazine and into the cartridge-receiving opening of said media drive unit, and for grippingly engaging a cartridge at least partially disposed in said media drive unit and pulling it into said magazine, said cartridge-loading/unloading means being rotatably carried by said turntable means and selectively positionable at each said loading/unloading station, said magazine means being rotatable independent of said cartridge-loading/unloading means when said loading/unloading means is disposed at a loading-/unloading station, and the principle operative components of the system include the said carousel means, said media drive unit, said drive unit, and said cartridge loading/unloading means.

2. An automatic library system as recited in claim 1, and further comprising:

a housing for enclosing at least the principal operative components of the system; and access door means disposed at one of said loading/unloading stations and including means forming a receptacle for a cassette to be loaded into the system or offloaded from the system, said receptacle being movable between a first position extending outside of said housing and a second position at least partially within said housing, and wherein said cartridge-loading/unloading means is further operative to alternatively grippingly engage a cartridge contained in said access door means when it is in said second position and draw the cartridge into one of the slots of said magazine means, and to push a cartridge out of said magazine means and into said access door means.

3. An automatic library system as recited in claim 2 wherein said access door means further includes pivot means attached to and about which said receptacle means can be rotated in moving between said first position and said second position, and latch means for holding said receptacle means in said second position.

4. An automatic library system as recited in claim 3 wherein said latch means is engageable by said cartridge-loading/unloading means and operative in response to such engagement to release said receptacle means.

5. An automatic library system as recited in claim 4 wherein said access door means further includes sensor means for determining whether or not said receptacle means is in said second position and whether or not a cartridge is contained in said receptacle means.

6. An automatic library system as recited in claim 1 wherein said turntable means includes at least three upstanding drive pins disposed around its perimeter, and wherein said magazine means includes pin-receiving apertures formed in the bottom surface thereof for engagement with said drive pins.

7. An automatic library system as recited in claim 6 wherein said turntable means includes a concentrically disposed support ring and said cartridge-loading/unloading means includes a circular base rotatably engaged with and supported by said support ring.

8. An automatic library system as recited in claim 7 wherein said cartridge loading/unloading means further includes a grabber means having a plurality of pivotable fingers adapted to selectively grip or push a cartridge, and carriage means for moving said grabber means along said radial lines so that said fingers can be caused to push a cartridge out of said magazine or pull a cartridge into said magazine.

9. An automatic library system as recited in claim 8 wherein said grabber means includes an upstanding support for supporting an actuator, an outwardly extending arm for pivotably supporting said fingers, and a puller bar connecting said actuator to said fingers, said actuator being operative to rotate said fingers between a gripping configuration and a non-gripping configuration.

10. An automatic library system as recited in claim 9 wherein said carriage means further includes a rack and pinion drive means for moving said grabber means relative to said circular base.

11. An automatic library system as recited in claim 1 and further comprising gate means disposed between said carousel means and said media drive unit, said gate means being movable between an open position and a closed position, said gate means being operative in said closed position to prevent a cartridge ejected from the drive unit from interferingly engaging said magazine means.

12. An automatic library system as recited in claim 11 and further comprising sensor means for determining whether said gate means is in said open position or said closed position.

13. An automatic library system as recited in claim 1 and further comprising means for determining a rotary position of said carousel means.

14. An automatic library system as recited in claim 13 and further comprising means for determining the rotary position of said cartridge-loading/unloading means.

15. An automatic library system as recited in claim 14 and further comprising means for determining whether or not a particular slot in said magazine means is occupied by a cartridge.

16. An automatic library system as recited in claim 1 wherein said magazine means includes a pair of identical molded parts each having slot-defining guide means integrally formed in a first side thereof, said molded parts being mated together with said first sides in facing relationship.

17. An automatic library system as recited in claim 16 wherein at least one of said molded parts includes resilient retainer means for engaging and holding a cartridge in each slot.

18. An automatic library system as recited in claim 17 wherein a second side of said molded parts has a plurality of radially elongated slotted holes provided around the periphery thereof for engagement by drive pins forming a part of said turntable means.

* * * * *